3,344,128
THIOUREA DIOXIDE AS REDUCTANT IN EMULSION POLYMERIZATION
Carl A. Uraneck, Bartlesville, Okla., assignor to Phillips Petroleum Company, a corporation of Delaware
No Drawing. Filed Apr. 12, 1965, Ser. No. 447,563
6 Claims. (Cl. 260—84.1)

This invention relates to the emulsion polymerization of conjugated alkadienes and copolymerization of mixtures of conjugated alkadienes and vinyl aromatic hydrocarbons.

Emulsion polymerization systems for conjugated alkadienes and conjugated alkadienes-vinyl aromatic hydrocarbons were first developed extensively during World War II. Such systems generally include water, a soap acting as emulsifying agent, an activator, an oxidant, and reductant. As optional ingredients, such systems also include electrolytes, surface active agents, and sequestering agents.

During the early development of emulsion polymerization, cumene hydroperoxide was used as the oxidizing component, but in recent years cumene hydroperoxide has been largely supplanted by p-menthane hydroperoxide. In these later-developed recipes, the activator consists of an iron salt, such as iron sulfate or iron nitrate, together with a sequestering agent, such as a sodium salt of ethylenediaminetetraacetic acid. Hydrazine sulfate, hydrazine or sodium sulfide is used as a reductant in certain of these recipes.

I have discovered that thiourea dioxide,

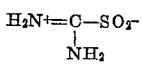

can be advantageously utilized in certain of these recipes as the reducing component, the result being that the percentage conversion of monomers attained in a given conversion time is substantially increased. Alternatively, if the same total conversion in a given period of time is desired, the amount of iron salt necessary can be substantially reduced when the thiourea dioxide is employed. This effect manifests itself in the sulfoxylate recipe, the Veroxazine recipe and the Veroxasulfide recipe.

The Veroxazine recipe comprises 0.1 to 5 parts of sodium pyrophosphate together with 0.001 to 1 part of the sodium salt of ethylenediaminetetraacetic acid as sequestering agent, 0.001 to 0.5 part of iron nitrate as activator, 0.05 to 1 part of hydrazine sulfate or hydrazine as reductant, and 0.001 to 0.3 part of p-menthane hydroperoxide as the oxidant. One to 10 parts of a suitable emulsifier, such as potassium fatty acid soap and 0.005 to 1 part of an electrolyte, such as potassium hydroxide, are generally included. The word "parts" as used herein and in the claims refers to parts by weight of the substance in question per 100 parts by weight of monomer or monomers.

In the Veroxasulfide recipe, potassium chloride is generally used as the electrolyte instead of potassium hydroxide, 0.001 to 0.2 part of sodium sulfide is used as reductant, and hydrazine and sodium pyrophosphate are omitted, the recipe being otherwise the same as the Veroxazine recipe.

In the sulfoxylate recipe, the emulsifier is generally 1 to 10 parts of fatty acid soap or a mixture of approximately equal parts of rosin acid soap and fatty acid soap. The recipe also generally comprises 0.05 to 2 parts of a surface active agent, such as the sodium salt of condensed sulfonic acid. Preferably both potassium hydroxide (.005 to 1 part) and potassium chloride (0.005 to 1 part) are used as electrolytes. The recipes included 0.001 to 0.5 part of iron sulfate as activator, 0.01 to 1 part of sodium formaldehyde sulfoxylate as the reducing agent, and 0.001 to 0.3 part p-menthane hydroperoxide as oxidant.

In these recipes, substitution of thiourea dioxide for the reducing agent previously employed produces increased conversion in a given period of time or, alternatively, permits the amount of activator (e.g., of iron compound) to be reduced while attaining the same conversion in the same time as the previously used recipes.

In accordance with the process of the invention, one or more conjugated alkadienes or mixtures of one or more conjugated alkadienes with one or more vinyl aromatic hydrocarbons can be employed as monomers. Examples of suitable conjugated alkadienes include 1,3-butadiene, 2,3-dimethyl-1,3-butadiene, isoprene, piperylene, and the like. Suitable vinyl aromatic hydrocarbons include styrene, various alkyl styrenes such as alpha-methylstyrene, and vinylnaphthalene and the like. In the copolymers the alkadiene should constitute at least 50 percent by weight of the total monomers. The presently preferred monomers are butadiene alone or a mixture of butadiene and styrene. In general the ratio of butadiene to styrene in such mixtures is between 65:35 and 90:10 by weight.

According to the invention, 0.01 to 0.5 part of the thiourea dioxide is utilized as reductant. The quantity of iron salt, for example, the sulfate or nitrate, employed is 0.001 to 0.5 part. Ordinarily, at least .002 part of the iron compound is employed but the following data show that substantial conversions can be obtained with the thiourea dioxide when the iron salt is omitted altogether, although the conversion time is rather long. In particular, conversions of the order of 60 percent can be obtained with the thiourea dioxide-p-menthane hydroperoxide system in the absence of iron salt as compared to conversions on the order of 10 percent with sodium formaldehyde sulfoxylate as reduction in the absence of iron salt.

In the polymerization system of the invention, 0.001 to 0.3 part of an organic peroxide, organic hydroperoxide or hydrogen peroxide is utilized as the oxidant. Suitable organic hydroperoxides include p-menthane hydroperoxide, cumene hydroperoxide, methylcyclohexane hydroperoxide, 2,3-dimethylbutane hydroperoxide and the like. Suitable organic peroxides include dicumyl peroxide, di-t-butyl peroxide, benzoyl peroxide, caprylyl peroxide, propionyl peroxide, and the like. The recipe includes 50-250 parts of water together with 1 to 10 parts of an emulsifying agent, such as rosin acid soap, fatty acid soap or a mixture of the two. The recipe can also include 0.001 to 1 part of a sequestering agent. The particular sequestering agent is not a feature of the present invention, and it can even be omitted according to the broader aspects thereof. The sodium salt of ethylenediaminetetraacetic acid can be employed as sequestering agent in the sulfoxylate and Veroxasulfide recipes while a mixture of this compound with sodium pyrophosphate can be utilized as the sequestering agent in the Veroxazine recipe. Preferably, but not necessarily, other ingredients of the recipe include electrolytes, for example, 0.005 to 1 part of a potassium compound, for example, potassium hydroxide or potassium chloride. Mixtures of the potassium hydroxide and potassium chloride can also be employed. Also, as optional ingredients of the polymerization system, there may be included up to 2 parts of the sodium salt of condensed sulfonic acids and up to 5 parts of sodium pyrophosphate.

The polymerization recipe can also include a modifier as is well known to those skilled in the art. Alkyl mercaptans, either primary, secondary or tertiary, having 8 to 16 carbon atoms, are suitable and can be added in amounts of 0.05 to 0.3 part or, more broadly, up to 1 part.

The polymerization temperature is not critical, and can range between −70 and +150° C. At temperatures below 0° C. antifreeze agents such as methanol, ethanol, glycol, and the like can be employed.

The following specific examples are set forth to provide preferred recipes and operating conditions, and should not be construed to unduly limit the invention.

*Example I*

Two recipes were used for testing my invention in the sulfoxylate system, as follows:

|  | Parts by Weight | |
|---|---|---|
|  | Recipe I [1] | Recipe II [2] |
| 1. Soap solution: | | |
| Water | 166.5 | 166.5 |
| Rosin acid soap | 2.25 | |
| Potassium fatty acid soap | 2.25 | 4.6 |
| KOH | 0.06 | 0.03 |
| KCl | 0.30 | 0.30 |
| Sodium salt of condensed sulfonic acid | 0.20 | 0.20 |
| Sodium salt of ethylenediaminetetraacetic acid | 0.017 | |
| 2. Reductant solution: | | |
| Sodium formaldehyde sulfoxylate | Variable | Variable |
| Thiourea dioxide | Variable | Variable |
| Water | 1.0 | 1.0 |
| 3. Activator solution: | | |
| Water | 12.5 | 12.5 |
| $FeSO_4 \cdot 7H_2O$ | Variable | Variable |
| Sodium salt of ethylenediaminetetraacetic acid | Variable | Variable |

[1] Fatty/rosin acid emulsifier.
[2] Fatty acid emulsifier.

In all tests, the soap solution and reductant solution were added to the reactor bottle, followed by 30 parts of styrene containing either 0.21 (Recipe I) or 0.25 (Recipe II) part of tertiary dodecyl mercaptan modifier, and 70 parts of butadiene. The bottle was then capped with rubber and punched-crown caps, and 0.063 part of p-menthane hydroperoxide oxidant in benzene solution was added by syringe. The bottle was then tumbled in a constant-temperature bath at 41° F. for 30 minutes, the activator solution was added by syringe, and tumbling was continued for an additional variable period. At the end of the reaction period 0.16 part of sodium dimethyl dithiocarbamate was added as a short stop, and 1.5 parts of a slurry of trisnonylphenylphosphite in 50–50 water-isopropyl alcohol was added as antioxidant. The resulting rubber was creamed with 25 percent aqueous sodium chloride solution, and coagulated with 2 percent aqueous sulfuric acid solution to a pH of 3–4. The serum was poured off through cheese-cloth. The rubber crumb was washed once with deionized water at room temperature, and then three times at about 130° F. The washed crumb was dried overnight in a forced-draft air oven at 155° F.

The following runs show that the rate of polymerization is higher with thiourea dioxide (TDO) reductant than with sodium formaldehyde sulfoxylate (SFS) reductant in the absence of the iron compound activator.

|  | Recipe II | |
|---|---|---|
| Run No | 1 | 2 |
| Reductant: | | |
| Type | SFS | TDO |
| Parts per 100 g. monomers | 0.0500 | 0.0350 |
| Millimols per 100 g. monomers | 0.325 | 0.324 |
| Activator: | | |
| $FeSO_4 \cdot 7H_2O$, parts per 100 g. monomers | 0.000 | 0.000 |
| Sodium salt of ethylenediaminetetraacetic acid, parts per 100 g. monomers | 0.000 | 0.000 |
| Time, hr | 70.2 | 70.2 |
| Conversion, wt. percent | 9.1 | 59.3 |

The following runs demonstrate that the rate of polymerization is higher with thiourea dioxide (TDO) reductant than with sodium formaldehyde sulfoxylate (SFS) reductant in the presence of the ferrous sulfate activator:

|  | Recipe | | | | |
|---|---|---|---|---|---|
|  | I | | | II | |
| Run No | 3 | 4 | 5 | 6 | 7 |
| Reductant: | | | | | |
| Type | SFS | TDO | TDO | SFS | TDO |
| Parts per 100 g. monomers | 0.0500 | 0.0350 | 0.0350 | 0.0498 | 0.0349 |
| Millimols per 100 g. monomers | 0.325 | 0.324 | 0.324 | 0.324 | 0.324 |
| Activator: | | | | | |
| $FeSO_4 \cdot 7H_2O$, parts per 100 g. monomers | 0.004 | 0.004 | 0.006 | 0.01 | 0.01 |
| Sodium salt of ethylenediaminetetraacetic acid, parts per 100 g. monomers | 0.0129 | 0.0129 | 0.0211 | 0.0325 | 0.0325 |
| Time, hr | 9.7 | 8.7 | 7.0 | 6.25 | 5.75 |
| Conversion, wt. percent | 55.7 | 61.7 | 56.9 | 56.7 | 59.1 |

Runs were made utilizing Recipe II described above wherein the p-menthane hydroperoxide was replaced with other oxidants at the same millimol level. The results were as follows:

| Run No | 8 | 9 | 10 |
|---|---|---|---|
| Reductant: | | | |
| Type | TDO | TDO | TDO |
| Millimol | 0.325 | 0.325 | 0.325 |
| Activator: | | | |
| $FeSO_4 \cdot 7H_2O$, millimol | 0.036 | 0.036 | 0.306 |
| Sodium salt of ethylenediaminetetraacetic acid, millimol | 0.108 | 0.108 | 0.108 |
| Oxidant: | | | |
| Type | PMHP | [1] CHP | $H_2O_2$ |
| Millimol | 0.36 | 0.43 | 0.36 |
| Hours/Conversion, Percent: | | | |
| 5 | 62 | 29 | 0 |
| 10 | | 50 | 0 |
| 20 | | | 4 |
| 60 | | | 49 |
| 90 | | | 60 |

[1] Cumene hydroperoxide.

*Example II*

In the following runs utilizing the Veroxazine recipe, aqueous soap solution was charged to nitrogen purged bottles and kept under nitrogen until the addition of styrene. Mixed tertiary dodecyl mercaptans were added followed by butadiene and the bottles capped. The p-menthane hydroperoxide was charged as a toluene solution and the bottles placed in a 41° F. bath to preagitate for 20 to 30 minutes. After preagitation, the hydrazine, hydrazine sulfate, or thiourea dioxide was charged and then the polymerizations were activated with ferric nitrate, and sodium pyrophosphate before returning to the 41° F. bath. The same procedure was followed in the runs utilizing the Veroxasulfide recipe, except that the potassium chloride solution was added after the mercaptan and the ferric nitrate sodium salt of ethylenediaminetetraacetic acid activator was added after preagitation. The reductant, sodium sulfide or thiourea dioxide, was charged last.

TABLE I

|  | Parts by Weight | |
| --- | --- | --- |
|  | Veroxazine | Veroxasulfide |
| Butadiene | 70 | 70 |
| Styrene | 30 | 30 |
| Water | 190 | 190 |
| KFA Soap | 5.0 | 5.0 |
| KCl |  | 0.50 |
| $Na_4P_2O_7 \cdot 10H_2O$ | 1.35 (3.03 mmole) |  |
| Sodium salt of ethylenediaminetetraacetic acid | 0.164 (0.363 mmole) | 0.016 (0.036 mmole) |
| $Fe(NO_3)_3 \cdot 9H_2O$ | 0.073 (0.18 mmole) | 0.0073 (0.018 mmole) |
| Hydrazine sulfate or hydrazine | Variable |  |
| Sodium sulfide |  | Variable |
| Thiourea dioxide | Variable | Variable |
| p-Menthane hydroperoxide | 0.103 (0.60 mmole) | 0.103 (0.60 mmole) |
| Mercaptan | 0.30 | 0.30 |

TABLE II.—THIOUREA DIOXIDE AS SUBSTITUTED REDUCTANT IN THE VEROXAZINE AND VEROXASULFIDE RECIPES

| Run No | 1 | 2 | 3 | 4 | 5 | 6 | 7 | 8 |
| --- | --- | --- | --- | --- | --- | --- | --- | --- |
| Recipe | Veroxazine | | | | Veroxasulfide | | | |
| Hydrazine: | | | | | | | | |
| Parts per 100 g. monomers | | | | 0.2 | | | | |
| Millimole | | | | 6.3 | | | | |
| Hydrazine sulfate: | | | | | | | | |
| Parts per 100 g. monomers | 0.40 | | | | | | | |
| Millimole | 3.07 | | | | | | | |
| Sodium sulfide: | | | | | | | | |
| Parts per 100 g. monomers | | | | | 0.020 | | | |
| Millimole | | | | | 0.26 | | | |
| KOH a | 0.34 | | | | | | | |
| Thiourea dioxide: | | | | | | | | |
| Parts per 100 g. monomers | | 0.052 | 0.110 | | | 0.013 | 0.026 | 0.052 |
| Millimole | | 0.48 | 1.02 | | | 0.12 | 0.24 | 0.48 |
| Hours: | | | | | | | | |
| 2 | 7.4 | 32.2 | 36.3 | 7.4 | 17.3 | 10.6 | 15.0 | 16.7 |
| 4 | 15.8 | 58.8 | 60.4 | 15.8 | | | | |
| 5 | | | | | 26.4 | 24.0 | 31.5 | 33.3 |
| 6 | 25.5 | 72.2 | 73.6 | 25.2 | | | | |
| 8 | 35.2 | | | 35.2 | | | | |
| 10 | 45.6 | | | 45.6 | 33.5 | 41.4 | 50.1 | 52.0 |
| 14 | 67.3 | | | 67.3 | 35.1 | 53.0 | 61.3 | 63.0 | a To neutralize the hydrazine sulfate.

It is evident that the polymerization rate was increased considerably in the Veroxazine recipe by use of thiourea dioxide instead of hydrazine or hydrazine sulfate. Polymerization died out in the Veroxasulfide recipe utilizing sodium sulfide (Run 5) after reaching approximately 34 percent in 10 hours. With thiourea dioxide substituted in the Veroxasulfide recipe, reasonably consistent polymerization rates were obtained over a relatively broad range of thiourea dioxide (Runs 6, 7 and 8). Conversions of 53 to 63 percent were obtained in 14 hours. Polymerization rates increased with an increase in the thiourea dioxide level.

The results, therefore, indicate that the thiourea dioxide produces a substantial increase in conversion within a given interval of time when used as the reduction agent in the sulfoxylate recipe, the Veroxazine and the Veroxasulfide recipes.

Various modification and variations of this invention will become apparent to those skilled in the art from the foregoing discussion without departing from the scope and spirit of this invention; and, it should be understood that this invention is not to be limited by the preferred embodiments set forth herein for illustrative purposes.

I claim:
1. In the aqueous emulsion polymerization of a monomeric material selected from the group consisting of butadiene and an admixture of butadiene and styrene, the improvement which consists in carrying out the polymerization in the presence of 0.01 to 0.5 part of thiourea dioxide as a reducing agent, 1 to 10 parts of at least one emulsifying agent selected from the group consisting of rosin acid and fatty acid soap, 0.001 to 0.3 part p-menthane hydroperoxide as oxidant, 0.001 to 0.5 part of at least one iron salt selected from the group consisting of iron sulfate and iron nitrate, 0.005 to 1 part of a potassium compound selected from the group consisting of potassium chloride and potassium hydroxide as electrolyte and 0.001 to 1 part of the sodium salt of ethylenediaminetetraacetic acid, all the foregoing parts being expressed as parts by weight per 100 parts by weight of monomeric material.

2. In the aqueous emulsion polymerization of a monomeric material selected from the group consisting of butadiene and butadiene-styrene, the improvement which consists in carrying out the polymerization in the presence of 0.01 to 0.5 part of thiourea dioxide as a reducing agent, 0.001 to 0.3 part p-menthane hydroperoxide as oxidant, 1 to 10 parts of soap as an emulsifying agent, 0.001 to 0.5 part of iron sulfate, 0.001 to 1 part of the sodium salt of ethylenediaminetetraacetic acid, 0.005 to 1 part of potassium hydroxide, and 0.01 to 1 part potassium chloride, all the foregoing parts being expressed as parts by weight per 100 parts by weight of monomeric material.

3. The process of claim 2 in which the emulsifying agent is rosin acid soap.

4. The process of claim 2 in which the emulsifying agent is made up of approximately equal parts of rosin acid soap and fatty acid soap.

5. In the aqueous emulsion polymerization of a monomeric material selected from the group consisting of butadiene and butadiene-styrene, the improvement which consists in carrying out the polymerization in the presence of 0.01 to 0.5 part of thiourea dioxide as a reducing agent, 1 to 10 parts of potassium fatty acid soap as an emulsifying agent, 0.001 to 0.3 part p-menthane hydroperoxide as the oxidant, 0.001 to 0.5 part of iron nitrate, 0.005 to 1 part of potassium hydroxide, 0.1 to 5 parts of sodium pyrophosphate, and 0.001 to 1 part of the sodium salt of ethylenediaminetetraacetic acid, all the foregoing parts being expressed as parts by weight per 100 parts by weight of monomeric material.

6. In the aqueous emulsion polymerization of a monomeric material selected from the group consisting of butadiene and butadiene-styrene, the improvement which consists in carrying out the polymerization in the presence of 0.01 to 0.5 part of thiourea dioxide as a reducing agent, 1 to 10 parts of potassium fatty acid soap as an emulsifying agent, 0.001 to 0.3 part p-menthane hydroperoxide as the oxidant, 0.001 to 0.5 part of iron nitrate, 0.005 to 1 part potassium chloride, and 0.001 to 1 part of the sodium salt of ethylenediaminetetraacetic acid, all the foregoing parts being expressed as parts by weight per 100 parts by weight of monomeric material.

References Cited

UNITED STATES PATENTS

| | | | |
|---|---|---|---|
| 2,680,111 | 6/1954 | Brown | 260—84.3 |
| 2,679,497 | 5/1954 | Uraneck et al. | 260—84.3 |
| 2,682,530 | 6/1954 | St. John | 260—84.3 |

FOREIGN PATENTS

| | | |
|---|---|---|
| 697,787 | 11/1964 | Canada. |
| 586,796 | 4/1947 | Great Britain. |
| 844,592 | 8/1960 | Great Britain. |

JAMES A. SEIDLECK, *Primary Examiner.*

JOSEPH L. SCHOFER, *Examiner.*